United States Patent
McArthur

(10) Patent No.: US 6,209,309 B1
(45) Date of Patent: Apr. 3, 2001

(54) PULSE WIDTH MODULATED FUEL FLOW CONTROL FOR AN ENGINE

(75) Inventor: Malcolm John McArthur, Fallbrook, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 08/995,129

(22) Filed: Dec. 19, 1997

(51) Int. Cl.$^7$ ................................ F02C 9/32; F04B 49/00
(52) U.S. Cl. .................... 60/39.03; 417/295; 417/505; 417/279; 137/487.5; 137/565.11
(58) Field of Search .................... 417/279, 295, 417/298, 381, 505; 60/39.281, 734, 39.03; 137/487.5, 565.16, 565.13, 565.11, 206

(56) References Cited

U.S. PATENT DOCUMENTS

| | | | |
|---|---|---|---|
| 3,043,107 | * 7/1962 | Magnus, Jr. | 417/79 |
| 3,123,128 | * 3/1964 | Zeisloft | 417/295 |
| 3,418,805 | 12/1968 | Barish et al. . | |
| 3,449,911 | * 6/1969 | Schlosser | 417/295 |
| 3,688,495 | 9/1972 | Fehler et al. . | |
| 3,798,901 | 3/1974 | Lewenhaupt . | |
| 3,936,235 | * 2/1976 | Larsen | 417/279 |
| 3,946,551 | 3/1976 | Linebrink et al. . | |
| 4,015,426 | 4/1977 | Hobo et al. . | |
| 4,018,685 | * 4/1977 | Saunders et al. | 137/565.16 |
| 4,230,146 | * 10/1980 | Kobayashi | 137/565.13 |
| 4,250,857 | * 2/1981 | Taplin | 123/448 |
| 4,385,489 | 5/1983 | Abbott . | |
| 4,386,553 | 6/1983 | Thoman et al. . | |
| 4,393,651 | * 7/1983 | Peck et al. | 60/39.281 |
| 4,578,945 | 4/1986 | Peck et al. . | |
| 4,640,093 | 2/1987 | Eastman . | |
| 4,643,635 | * 2/1987 | Leachman, Jr. | 415/1 |
| 4,896,548 | * 1/1990 | Lalin et al. | 73/864.34 |
| 4,926,629 | * 5/1990 | Eick et al. | 60/39.281 |
| 5,042,256 | 8/1991 | Smith . | |
| 5,059,998 | * 10/1991 | Sasaki et al. | 137/624.11 |
| 5,199,853 | * 4/1993 | Padden | 417/295 |
| 5,199,855 | * 4/1993 | Nakajima et al. | 417/295 |
| 5,368,273 | * 11/1994 | Dante | 60/39.281 |

FOREIGN PATENT DOCUMENTS

| | | |
|---|---|---|
| 4035880 | 7/1992 | (DE) . |
| 2168764 | 6/1986 | (GB) . |
| 9004714 | 5/1990 | (WO) . |

\* cited by examiner

*Primary Examiner*—Ted Kim
(74) *Attorney, Agent, or Firm*—Wood Phillips VanSanten Clark & Mortimer

(57) ABSTRACT

Mechanical complexity and high cost in a fluid flow control system are avoided through the use of a pulse width modulated (PWM) valve (20) to meter a fluid flow to an inlet (50) of a pump (16) that pumps the metered flow to an outlet (56) of the fuel pump (12). The system utilizes a pulsating vapor core in the pump (16) to dampen the pulses in the fluid flow generated by the PWM valve (20). A regulator valve (22) is provided to maintain a relatively constant pressure drop across the PWM valve (20). The control system is ideally suited for controlling the flow of fuel to a gas turbine engine.

3 Claims, 1 Drawing Sheet

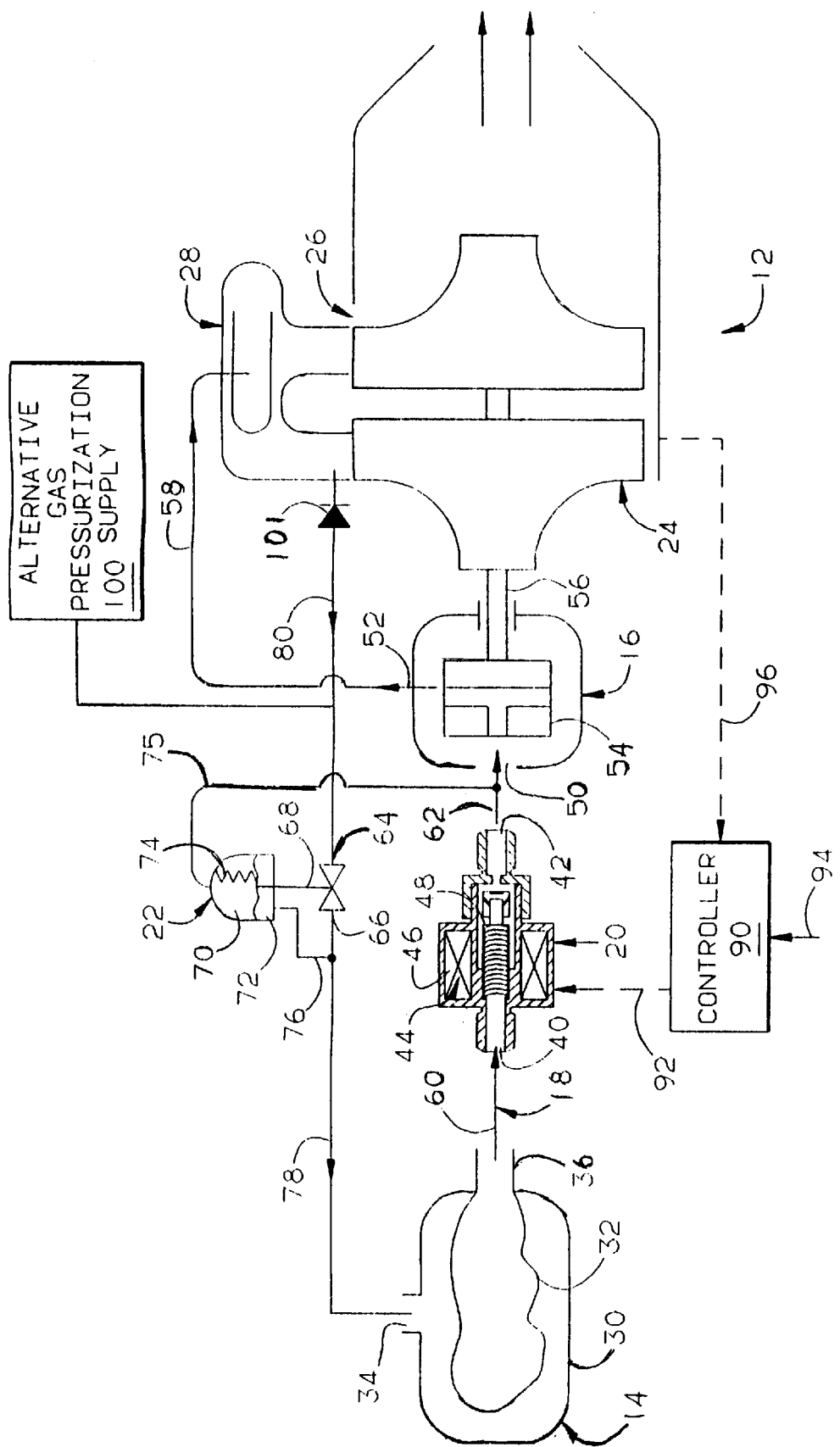

PULSE WIDTH MODULATED FUEL FLOW CONTROL FOR AN ENGINE

FIELD OF THE INVENTION

This invention generally relates to the art of fluid controls and, more particularly, to fuel controls for combustion engines such as gas turbine engines that provide primary or secondary power to a vehicle.

BACKGROUND OF THE INVENTION

Cost and size of engine components are of constant concern in vehicular engine applications. This is particularly true for small turbojet engines that are designed for use in missiles and other short-life/disposable applications.

It is known to use a pulse width modulated valve (PWM valve) on the high pressure side of a fuel pump to meter the fuel flow to a gas turbine engine by cycling the PWM valve between an on and off position. Fuel flow is determined by the time period that the valve is open during each cycle and by the cycle frequency. Typically, such systems utilize a regulator valve to control the inlet pressure to the PWM valve by bypassing fuel flow from the high pressure side of the fuel pump back to the fuel tank. Examples of such systems are shown in U.S. Pat. Nos. 3,568,495 to Fehler et al.; 3,936,551 to Linebrink et al.; and 4,015,326 to Hobo et al.

Two disadvantages associated with these systems are the size and cost of the PWM valve components which must be designed to withstand the output pressure of the fuel pump, which commonly is in the range of 100–200 psig to provide adequate fuel injection pressure to the combustor.

Another disadvantage associated with these systems is the wasted power input into the pressurized fuel flow that is bypassed by the regulator valve from the high pressure side of the fuel pump back to the fuel tank. The wasted power is particularly critical in missiles and other vehicles having a limited fuel capacity and a mission profile that may be determined by the time required to deplete the stored fuel.

Yet another disadvantage associated with these systems is the pulsating flow generated by the PWM valve as it cycles between its open and closed positions. Such pulsating flow can result in combustor flameout and/or deleteriously affect the combustor stability. Accordingly, depending on the engine and combustor parameters, these systems typically require some form of accumulator/damper in the high pressure fuel line connecting the PWM valve to the combustor to dampen the pulses in the fuel flow to the combustor. The accumulator/damper is an additional component that adds cost, complexity and weight to the system and introduces a potential failure point in the system.

Thus, it can be seen that there is a need for a small, low-cost, and efficient fuel control system for gas turbine engines and, in particular, for small turbojet engines.

SUMMARY OF THE INVENTION

It is the principal object of the invention to provide a new and improved fluid flow control system.

More specifically, it is an object to provide a small, low cost fluid flow control, and particularly a small, low-cost fuel control system for a gas turbine engine and, in particular, for small turbojet engines.

It is a further object of the invention to provide a fluid flow control system that utilizes a PWM valve to meter the fluid flow without requiring any additional components dedicated to damping pulses in the fluid flow generated by the PWM valve.

It is a further object of the invention to provide a fuel control system that reduces or eliminates the energy wasted in bypassing pressurized fuel flow from a pump outlet back to a fuel tank.

These and other objects of the present invention are attained in a fluid flow control in the form of a fuel control system that utilizes a PWM valve to meter a fuel flow to the inlet of a fuel pump that pumps the metered fuel flow to an engine. By virtue of this construction, the PWM valve is not subjected to the output pressure of the fuel pump. This allows the fuel control system to utilize a small, low-cost PWM valve, such as is commonly used in connection with automotive fuel injectors. Further, because the fuel is metered prior to entering the fuel pump, the fuel pump only pumps the precise amount of fuel required for the engine and no energy is wasted in pumping a fuel flow that must be bypassed back to a fuel tank. Additionally, because the PWM valve is on the inlet side of the fuel pump, the fuel pump can be utilized to dampen the PWM valve generated pulses in the fuel flow by operating with a vapor core wherein fuel is vaporized at the pump inlet and reformed back to liquid at the pump outlet, thereby damping the pulses.

According to one aspect of the invention, a method for controlling a fluid flow rate from a pump is provided and includes the steps of providing a pump having a pump inlet and a pump outlet, and a fluid flow path to the pump inlet. The fluid flow path is cyclically restricted to achieve a fuel flow to the pump inlet that cycles between a first flow rate for a time period T1 and a second flow rate for a time period T2, with the second flow rate T2 being greater than the first flow rate. The fluid flow to the pump inlet is pumped by the pump from the pump inlet to the pump outlet.

According to another aspect of the invention, the method further includes the steps of vaporizing at least a portion of the fluid flow at the pump inlet for at least a portion of the time period T1 and reforming the vaporized fluid flow back to liquid at the pump outlet.

According to another aspect of the invention, an improvement is provided in a method for controlling the fluid flow rate from a pump including the steps of providing a pump having a pump inlet and a pump outlet, providing a substantially liquid fluid flow to the pump inlet, pumping the fluid flow with the pump from the pump inlet to the pump outlet while creating a pressure at the pump outlet that is above the vapor pressure of the fluid flow at the outlet. The improvement includes repetitively reducing the pressure at the pump inlet to a value below the vapor pressure of the fluid flowing into the pump inlet to provide a vapor core within the pump sufficient to dampen pulses in the fluid flow.

Other objects, advantages and novel features of the present invention will be apparent to those skilled in the art upon consideration of the following drawing and detailed description of the preferred embodiments.

BRIEF DESCRIPTION OF THE DRAWING

The FIGURE is a diagrammatic illustration of a fluid flow control unit in the form of a fuel control system embodying the present invention in combination with a gas turbine engine.

DESCRIPTION OF THE PREFERRED EMBODIMENTS

With reference to the FIGURE, an exemplary embodiment of a fluid flow control system made according to the invention is described and illustrated in connection with a fuel control system for a gas turbine engine, shown generally at 12. However, it should be understood that the invention may find utility in other applications, and that no limitations to use as a fuel control system for a gas turbine engine is intended except insofar as expressly stated in the appended claims.

The fuel control system includes a pressurized fuel storage device or fuel tank 14; a fuel pump 16; a fuel flow path 18 from the fuel storage device 14 to the fuel pump 16; a restricting means, shown in the form of a PWM valve 20, for cyclically restricting the fluid flow path 18 to achieve a fuel flow to the pump inlet that cycles between a first flow rate for a time period T1 and a second flow rate for a time period T2, with the second flow rate being greater than the first flow rate; and means, shown in the form of a regulator valve 22, for regulating pressure in the storage device 14 to achieve a desired average pressure differential in the fuel flow across the PWM valve 20.

The gas turbine engine 12 may be of any known construction and includes a compressor section 24, a turbine section 26, and a combustor assembly 28. As is known, the compressor section 24 supplies a pressurized airflow to the combustor assembly 28 where the airflow is mixed with fuel and combusted to produce a hot gas flow that is expanded through the turbine section 26 to produce shaft power and/or thrust from the gas turbine engine 12. It is anticipated that the fuel control system will be particularly useful with gas turbine engines 12 in the form of small turbojets, such as those disclosed in U.S. Pat. Nos. 5,207,042, issued May 4, 1993 to Rogers et al. and 4,794,742, issued Jan. 3, 1989 to Shekleton et al., the entire disclosures of which are herein incorporated by reference.

The pressurized fuel storage device 14 may be of any known construction and is shown in the form of a pressure tank or chamber 30 and a fuel bladder 32 contained within the pressure chamber 30. The pressure chamber 30 includes a pressure port 34 for receiving a regulating air pressure flow from the compressor section 24. The pressure chamber 30 further includes a fuel outlet port 36 for supplying fuel from the fuel bladder 32 to the fuel flow path 18.

The PWM valve 20 includes a valve inlet 40, a valve outlet 42, and an electromagnetically actuated spool assembly 44 including a solenoid 46 and a metering spool 48. It should be appreciated that any known type of PWM valve 20 may be utilized in the fuel control system and that the valve 20 selected will depend upon the environment and installation requirements, the fuel flow requirements and the operating parameters of the particular engine 12 selected for use with the system.

The fuel pump 16 may be of any known type and is shown in the form of a centrifugal pump including a pump inlet 50, a pump outlet 52, and a centrifugal impeller 54 that is driven by a shaft 56 powered by the gas turbine engine 12. The pump outlet 52 is connected to the combustor assembly 26 by a high pressure fuel conduit 58.

The fuel flow path 18 is shown in the form of a first conduit 60 that directs flow from the fuel outlet port 36 to the valve inlet 40, and a second conduit 62 that directs flow from the valve outlet 42 to the pump inlet 50.

The regulator valve 22 is basically conventional and is to provide a regulated, constant pressure differential across the PWM valve 20. The regulator valve 22 includes an air inlet 64, an air outlet 66, and a regulating spool 68 for metering the airflow from the air inlet 64 to the air outlet 66. The valve 22 further includes pressure chambers 70 and 72 separated by a piston or diaphragm 73. The regulating spool 68 is controlled by the pressure differential between pressure chambers 70 and 72 acting upon the diaphragm 73 and by a biasing spring 74. The pressure chamber 70 is connected by a pressure tap 75 to the conduit 62 between the valve outlet 42 and the pump inlet 50. The pressure chamber 72 is connected by a pressure tap 76 to an airflow conduit 78 between the air outlet 66 and the pressure port 34. The air inlet 64 is connected to the compressor section 24 by an airflow conduit 80.

A controller 90 in the form of a digital electronic controller provides control signals 92 to the PWM valve 20 based on engine speed and power command signals 94 and engine parameter signals 96, as is known. The controller 90 preferably utilizes conventional digital techniques for providing the control signal 92 to the PWM valve 20, as is known. Accordingly, further description of the constructional details of the controller 90 are not required, it being sufficient to note, that to increase the fuel flow rate from the valve outlet 42 to the pump inlet 50, the controller 90 adjusts the control signal 92 to cause an increase in the time period T2 for the second flow rate and a decrease in the time period T1 for the first flow rate. Conversely, to decrease the fuel flow rate from the valve outlet 42 to the pump inlet 50, the controller 90 adjusts the control signal 92 to cause a decrease in the time period T2 for the second flow rate and an increase in the time period T1 for the first flow rate.

An alternative gas pressurization supply 100 is provided for engine starting. A check valve 101 in the airflow conduit prevents reverse flow of the gas from the supply 100 into the compressor section 24. Preferably, the supply 100 is in the form of compressed air tank or a start squib. During engine starting, the pressure port 34 receives a pressure flow from the supply 100 for pressurizing the storage device 14.

In operation, fuel flow is supplied to the valve inlet 40 at a pressure $P_u$ via the fuel bladder 32 and the conduit 60. Fuel flow is supplied to the pump inlet 50 at a pressure $P_1$ via the PWM valve 20 and the conduit 62. The fuel flow through the PWM valve 20 is controlled by a signal 92 from the controller 90 which causes the spool assembly 44 to cycle between a first position that allows a first flow rate for a time period T1 and a second position that allows a second flow rate for a time period T2. Typically, the first flow rate will be equal to zero or substantially equal to zero, and the second flow rate will be equal to or greater than the maximum fuel flow rate required for the gas turbine engine 12. Preferably, the spool assembly 44 is cycled at a fixed frequency and the fuel flow rate from the valve outlet 42 to the pump inlet 50 is controlled by adjusting one or both of the time periods T1, T2, as is known.

In order to insure that the flow through the PWM valve 20 has a relatively predictable relationship to the control signal 92, it is important to maintain a relatively constant pressure drop $\Delta P$ ($\Delta P = P_u - P_i$) across the PWM valve 20. This function is performed by the regulator valve 22 which senses the pressures $P_u$ and $P_i$ and controls the pressure $P_u$ to maintain a relatively constant $\Delta P$. More specifically, the pressure chamber 70 is pressurized to $P_i$ by the pressure tap 74 and the pressure chamber 72 is pressurized to the pressure $P_u$ by the pressure tap 76. The position of the metering spool 68 is controlled by the pressure differential, $\Delta P = P_u - P_i$, in the pressure chambers 70,72 to regulate a bleed airflow from the compressor section 24 to the pressurized fuel storage device 14. It should be noted that the above explanation assumes that the pressure $P_u$ at the valve inlet 40 is equal to the pressure in the airflow conduit 78 and the pressurized fuel storage device 14. It is believed that this assumption is essentially correct for most pressurized fuel storage devices utilizing a fuel bladder. However, the regulator valve 22 will still perform satisfactorily in any system where the pressure $P_u$ at the valve inlet 40 is dependent upon the pressure inside the storage device 14. Preferably, the regulator valve 22 has sufficient damping to accommodate any pressure pulses generated by the PWM valve 20 in the conduit 62 while maintaining a relatively constant ΔP across the PWM valve 20.

The fuel pump 16 pumps the fuel from the pump inlet 50 to the combustor assembly 28 via the conduit 58 at a pressure $P_b$. The fuel pump should be designed to attain the maximum pressure required by the combustor assembly 28. For a small turbojet engine, $P_b$ will typically vary from 25–160 psia during operation.

To prevent combustor flame-out or deleterious effects on combustor stability, it is preferred that the pulsating fuel flow output from the PWM valve 20 be damped to closely approximate steady state flow. In the preferred embodiment, this damping is primarily provided by a pulsating vapor core in the fuel pump 16. More specifically, the damping is provided by vaporizing a portion of the fuel flow at the pump inlet 50 for at least a portion of the time period T1 and re-forming the vaporized fuel back to liquid at the pump outlet 52 throughout the time periods T1 and T2. Fuel is vaporized at the pump inlet 50 during the time period T1 because the PWM valve 20 is essentially closed at this time while the pump 16 continues to operate. This causes the pressure at the pump inlet 50 to drop, resulting in such vaporization which forms the vapor core within the pump 16. When the PWM valve 20 again opens, fuel at about the pressure at the pressure port 34 is available at the inlet 50. This pressure is sufficiently close or above the vapor pressure of the fuel with the result that vaporization is reduced or ceases altogether, causing pulsating of the vapor core within the pump 16.

At the same time, the geometry of the pump 16 is such that pressure at its outlet 52 is always above the vapor pressure of the fuel. Consequently, only liquid fuel flows from the outlet 52. This flow is at a relatively constant pressure because the changing length of the vapor core within the pump as the vapor core forms and collapses in pulsating fashion acts as a damper for the pulsating liquid fuel flow through the PWM valve 20. The ability of centrifugal pumps to reform slugs of vaporized fuel back into liquid form is known and is dependent upon the flow characteristics of the pump and the pump inlet and outlet pressures. Accordingly, it is preferred that the pump 16 be a centrifugal pump and that the components 14, 16, 18, 20, and 22 of the fuel system be designed to provide a pressure Pi at the pump inlet 50 that allows for sufficient amount of vapor damping in the fuel pump 16.

While the exact amount of damping in the fuel flow required will be highly dependent upon the particular engine 12 selected for use with the system, it has been determined that for some systems and engines 12 the damping should be sufficient to reduce the pulse amplitude of $P_b$ to approximately 10% of the mean value of $P_b$ based on an operating frequency of 50 hertz for the PWM valve 20.

From the foregoing, it will be appreciated that, by placing the PWM valve 20 on the low pressure side of the fuel pump 16, the fuel control system may utilize a relatively small and low-cost PWM valve, such as is commonly used in connection with automotive fuel injectors.

It should further be appreciated that, by metering the fuel flow to the inlet 50 of the fuel pump, rather than from the outlet 52 of the fuel pump, the energy required to pressurize the fuel flow to the combustor is minimized because excess flow at high pressure does not exist and therefore need not be returned to the tank as in prior art systems.

It should also be appreciated that the placement of the PWM valve 20 on the inlet side of the fuel pump 16 provides the beneficial advantage of utilizing the fuel pump 16 to provide damping via a pulsating vapor core thereby to minimize the effects of the pulsated fuel flow from the PWM valve 20.

While a PWM valve 20 is preferred, any electromechanical or solenoid valve 20 capable of metering fuel flow by cyclically restricting the fuel flow path 18 to achieve a fuel flow to the pump inlet 50 that cycles between a first flow rate for a time period T1 and a second flow rate for a time period T2 may be utilized. Further, while pulse width modulated control is preferred, any form of control, including cycle frequency control, capable of causing a valve 20 to provide the desired cyclical restriction of the flow path 18 may be utilized. By way of further example, it is anticipated that some systems may utilize a fuel storage device 14 that is not pressurized and, further, may not require a relatively constant pressure differential ΔP across the valve 20.

What is claimed is:

1. A method for controlling a fluid flow rate from a pump, said method comprising the steps of:

providing a pump having a pump inlet and a pump outlet;

providing a fluid flow path to the pump inlet;

cyclically restricting the fluid flow path to achieve a fluid flow to the pump inlet that cycles between a first flow rate for a time period T1 and a second flow rate for a time period T2, the second flow rate being greater than the first flow rate;

pumping fluid with the pump from the pump inlet to the pump outlet;

providing a fluid storage device that supplies fluid to the fluid flow path;

providing a valve in the fluid flow path to perform the step of cyclically restricting the fluid flow path, the valve having a valve inlet receiving fluid flow from the fluid storage device and a valve outlet supplying fluid flow to the pump inlet;

pressurizing the fluid in the fluid storage device; and regulating the pressure in the fluid storage device to achieve a desired average pressure differential between the fluid flow at the valve inlet and the fluid flow at the valve outlet.

2. A method for controlling the fuel flow rate to a combustion engine, said method comprising the steps of:

providing a fuel storage device;

providing a pump having a pump inlet and a pump outlet;

providing a fuel flow path from the fuel storage device to the pump inlet;

cyclically restricting the fuel flow path to achieve a fuel flow to the pump inlet that cycles between a first flow rate for a time period T1 and a second flow rate for a time period T2, the second flow rate being greater than the first flow rate; and pumping the fuel with the pump from the pump inlet to a combustion engine for combustion therein without bypassing any of the fuel back to the pump inlet.

3. A method of claim 2 further comprising the steps of vaporizing at least a portion of the fuel flow at the pump inlet for at least a portion of the time period T1; and reforming the vaporized fuel flow back to liquid at the pump outlet to dampen pulses in the fuel flow created by the cyclically restricting step.

* * * * *